(12) United States Patent
Cholleton et al.

(10) Patent No.: US 12,169,768 B1
(45) Date of Patent: Dec. 17, 2024

(54) DEEP NEURAL NETWORK GENERATION OF DOMAIN NAMES

(71) Applicant: VERISIGN, INC., Reston, VA (US)

(72) Inventors: Aubry Cholleton, Fribourg (CH);
Andreas Fischer, Bienne (CH); Jean Hennebert, Thun (CH); Yannis Labrou, Washington, DC (US);
Vincent Raemy, Fribourg (CH);
Andrew West, Reston, VA (US);
Baptiste Wicht, Bonnefontaine (CH)

(73) Assignee: VeriSign, Inc., Reston, VA (US)

( * ) Notice: Subject to any disclaimer, the term of this patent is extended or adjusted under 35 U.S.C. 154(b) by 1185 days.

(21) Appl. No.: 15/595,679

(22) Filed: May 15, 2017

(51) Int. Cl.
*G06N 3/02* (2006.01)
*H04L 61/4511* (2022.01)

(52) U.S. Cl.
CPC ............ *G06N 3/02* (2013.01); *H04L 61/4511* (2022.05)

(58) Field of Classification Search
None
See application file for complete search history.

(56) References Cited

U.S. PATENT DOCUMENTS

| | | | | |
|---|---|---|---|---|
| 9,058,393 B1 * | 6/2015 | Nicks | ................. | G06Q 30/0278 |
| 9,684,918 B2 * | 6/2017 | Kamdar | ............. | G06Q 30/0621 |
| 10,409,803 B1 * | 9/2019 | Lai | ..................... | G06F 16/2365 |
| 10,467,536 B1 * | 11/2019 | Lai | .......................... | G06N 20/00 |
| 2015/0106725 A1 * | 4/2015 | Kamdar | .............. | H04L 61/3025 |
| | | | | 715/739 |
| 2016/0232440 A1 * | 8/2016 | Gregor | ................. | G06N 3/0445 |
| 2016/0241510 A1 * | 8/2016 | Kamdar | ................ | H04L 61/302 |
| 2017/0171151 A1 * | 6/2017 | Raemy | .................... | G10L 15/16 |
| 2017/0351953 A1 * | 12/2017 | Raemy | ............... | H04L 61/1511 |
| 2019/0068551 A1 | 2/2019 | Bilsten | | |

OTHER PUBLICATIONS

Meyer, David. "How exactly does word2vec work?." Uoregon. Edu, Brocade. Com (2016). (Year: 2016).*
Haykin, Simon, and N. Network. "A comprehensive foundation." Neural networks 2.2004 (2004): 41. (Year: 2004).*
Vijayarani, S., and R. Janani. "Text mining: open source tokenization tools—an analysis." Advanced Computational Intelligence: An International Journal (ACII) 3.1 (2016): 37-47. (Year: 2016).*

(Continued)

*Primary Examiner* — Daniel T Pellett
(74) *Attorney, Agent, or Firm* — McCarter & English, LLP; Michael A. Sartori (57) ABSTRACT

Techniques for generating unregistered internet domain names using machine learning (e.g., neural networks) are presented. The techniques can include identifying, using an electronic processor, a subset of registered domain names having at least one specified characteristic, vectorizing, using an electronic processor, a training subset of domain names in the subset of registered domain names to obtain a set of vectors, training, using an electronic processor, a machine learning algorithm with the set of vectors to produce a trained machine learning model, generating, using an electronic processor, at least one output domain name by the trained machine learning model, and outputting the at least one output domain name.

24 Claims, 3 Drawing Sheets

(56) References Cited

OTHER PUBLICATIONS

Liu, Jialu, et al. "Mining quality phrases from massive text corpora." Proceedings of the 2015 ACM SIGMOD international conference on management of data. 2015. (Year: 2015).*

Andrej Karpathy, "The Unreasonable Effectiveness of Recurrent Neural Networks", May 21, 2015, Retrieved from the Internet Oct. 30, 2017: http://karpathy.github.io/2015/05/21/mn-effectiveness/, pp. 1-31.

Non-Final Office Action issued in corresponding U.S. Appl. No. 15/800,920 on May 10, 2019, pp. 1-13.

* cited by examiner

DEEP NEURAL NETWORK GENERATION OF DOMAIN NAMES

FIELD

This disclosure relates generally to internet domain names.

BACKGROUND

The domain name system ("DNS") is a hierarchical distributed naming system for resources provided by computer servers that are connected to the internet. It associates domain names to numeric internet protocol ("IP") addresses of internet resources, including resources managed by web hosting providers, which provide the web server computers that serve the web pages associated with domain names. The DNS thus allows computers and humans to access networked resources, including web pages, using names.

A DNS "registry" is an authoritative, master database of all domain names registered in a top-level domain or other domain in which domain names can be registered. A registry includes many hardware computer servers operably coupled to the internet. A registry keeps the master database and also generates a "zone file" comprising DNS resource records for the top-level domain, which allows computers to look up DNS records in the top-level domain from anywhere in the world. Internet users generally interact with the registry via intermediaries. For ease of discussion, a registry is identified with its hardware computer servers unless otherwise specified or clear from context.

A "domain investor" is an internet user that purchases a domain name with the intent to later resell it at a higher price. That is, domain investors are interested in selecting domain names that will have a high resale value.

SUMMARY

According to some embodiments, a method of generating unregistered internet domain names using machine learning is provided. The method includes identifying, using an electronic processor, a subset of registered domain names having at least one specified characteristic; vectorizing, using an electronic processor, a training subset of domain names in the subset of registered domain names to obtain a set of vectors; training, using an electronic processor, a machine learning algorithm with the set of vectors to produce a trained machine learning model; generating, using an electronic processor, at least one output domain name by the trained machine learning model; and outputting the at least one output domain name.

Various optional features of the above embodiments include the following. The outputting may include causing the at least one output domain name to be displayed. The method may include, prior to the vectorizing, thinning the subset of registered domain names to retain high-value domain names. The method may include presenting the at least one output domain name to a potential registrant; and registering the at least one output domain name to the potential registrant. The method may include tokenizing, prior to the vectorizing, the subset of registered domain names; and filtering, prior to the vectorizing, the subset of registered domain names to retain registered domain names with a high tokenization quality score. The method may include selecting, prior to the generating, a set of parameters for the trained machine learning model; evaluating, prior to the outputting, the trained machine learning model using the at least one output domain name; and repeating the selecting, the generating, and the evaluating at least once prior to the outputting. The evaluating may include one of: determining whether a ratio, of a number of registered domain names generated by the method that possess the at least one specified characteristic but that are not in the training subset of domain names, to a number of domain names generated by the method, exceeds a first predetermined threshold, or determining whether a success metric for applying a registered domain name classifier to domain names generated by the method exceeds a second predetermined threshold. The at least one specified characteristic may include at least one of: a registration history characteristic, a linguistic characteristic, a traffic characteristic, a whois information characteristic, a content characteristic, a geographical characteristic, a routing characteristic, an aftermarket pricing characteristic, a top-level-domain characteristic, or a security characteristic. The machine learning algorithm may be based on an electronically stored network including an input layer of nodes, at least one hidden layer of nodes, and an output layer of nodes. The machine learning algorithm may include at least one of: a feed-forward neural network, a recurrent neural network, a long-short term memory, or a convolutional neural network.

According to some embodiments, a system for generating unregistered internet domain names using machine learning is provided. The system includes at least one electronic processor configured to perform: identifying, using an electronic processor, a subset of registered domain names having at least one specified characteristic; vectorizing, using an electronic processor, a training subset of domain names in the subset of registered domain names to obtain a set of vectors; training, using an electronic processor, a machine learning algorithm with the set of vectors to produce a trained machine learning model; generating, using an electronic processor, at least one output domain name by the trained machine learning model; and outputting the at least one output domain name.

Various optional features of the above embodiments include the following. The outputting may include causing the at least one output domain name to be displayed on a computer monitor communicatively coupled to the at least one electronic processor. The at least one electronic processor may be further configured to, prior to the vectorizing, perform thinning the subset of registered domain names to retain high-value domain names. The at least one electronic processor may be further configured to perform: presenting the at least one output domain name to a potential registrant; and registering the at least one output domain name to the potential registrant. The at least one electronic processor may be further configured to perform: tokenizing, prior to the vectorizing, the subset of registered domain names; and filtering, prior to the vectorizing, the subset of registered domain names to retain registered domain names with a high tokenization quality score. The at least one electronic processor may be further configured to perform: selecting, prior to the generating, a set of parameters for the trained machine learning model; evaluating, prior to the outputting, the trained machine learning model using the at least one output domain name; and repeating the selecting, the generating, and the evaluating at least once prior to the outputting. The evaluating may include one of: determining whether a ratio, of a number of registered domain names generated by the method that possess the at least one specified characteristic but that are not in the training subset of domain names, to a number of domain names generated by the method, exceeds a first predetermined threshold, or determining whether a success metric for applying a registered domain name classifier to domain names generated by the method exceeds a second predetermined threshold. The at least one specified characteristic may include at least one of: a registration history characteristic, a linguistic characteristic, a traffic characteristic, a whois information characteristic, a content characteristic, a geographical characteristic, a routing characteristic, an aftermarket pricing characteristic, a top-level-domain characteristic, or a security characteristic. The machine learning algorithm may be based on an electronically stored network including an input layer of nodes, at least one hidden layer of nodes, and an output layer of nodes. The machine learning algorithm may include at least one of: a feed-forward neural network, a recurrent neural network, a long-short term memory, or a convolutional neural network.

Disclosed embodiments provide many advantages over the prior art. Some embodiments generate domain names of higher-quality than those that are selected by other techniques. Some embodiments save human labor by not having to enumerate or encode features manually. Some embodiments have the ability to capture deep contextual relationships at the character-level. These and other advantages are disclosed herein.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments include techniques for identifying and presenting to a user, such as a domain investor, domain names that he or she might be interested in registering. The suggested names are not currently registered, but are determined in a manner such that they are likely to be valuable to the user. The technique can accept as an input a list of registered domains in one or more top-level domains ("TLD") that have selected linguistic, metadata, and/or traffic characteristics. The input names may be chosen to be valuable to the user based on some criteria. A machine learning technique, such as pattern recognition via neural networks, is applied to learn the language, or "vocabulary", of the input names. The applied technique produces a trained language model. This model can then be used generatively to provide novel domain names that might be available in the zone. These names can be filtered to remove any already-registered domain names, and the results output to a user for inspection, possible registration, or other uses.

According to some embodiments, domain names that have been registered are considered as a subset of the vocabulary of a language. That vocabulary includes both registered strings (i.e., registered domain names) and strings that will be registered in the future. Of course, it is unknown a priori what might be registered in the future. Some embodiments operate based on the principle that strings registered in the future will be like those registered in the past because together they comprise the vocabulary of a (synthetic, unspoken) language.

The possible space of domain strings is very large. Its size equals the number of permissible characters (e.g., a-z, 0-9, and the hyphen character, a total of 37 characters), to the power of the maximum string length (e.g., 64). This yields, 3664 possible strings, an extremely large (100 digit) number. Though context dependent, the language gleaned by some embodiments is a relatively small subset of this possible space.

Some embodiments model the language of domain names given the known vocabulary of the language (i.e., registered domain name strings) and generate new strings (suggested domain names) in the language. The language model may be defined by the prescribed known vocabulary, and this vocabulary can be constrained across multiple dimensions to be as specific or as broad as needed.

Thus, some embodiments take as input previously registered domain names (selected using any, or a combination, of a multitude of linguistic, traffic, and other characteristics) and produce as an output one or more novel domain names that are not currently registered. Note that the model produced by the machine learning technique proposes names based on their resemblance to names in the input, where "resemble" goes beyond surface-level features, to deep linguistic characteristics, patterns, and contexts. Given this type of resemblance, such names are highly likely to be valuable to domain investors.

Some embodiments present a list of domain names that are "as valuable as the currently registered domains" (meaning "their resale value exceeds the purchase price"). Moreover, because a domain investor typically purchases a multitude of domain names and expects that the aggregate sales' proceeds will exceed the purchasing cost, "as valuable" here can be interpreted as applicable to a collection of names rather than just a single name. There are also alternative ways to construe "value". For example, a large portfolio of domain names may exist primarily for the brand protection of an entity. Such purchased names might form an input set, with the goal of outputting available names that represent gaps in that protection scheme. Other uses and characterizations of "value" are also contemplated.

Figure 1:
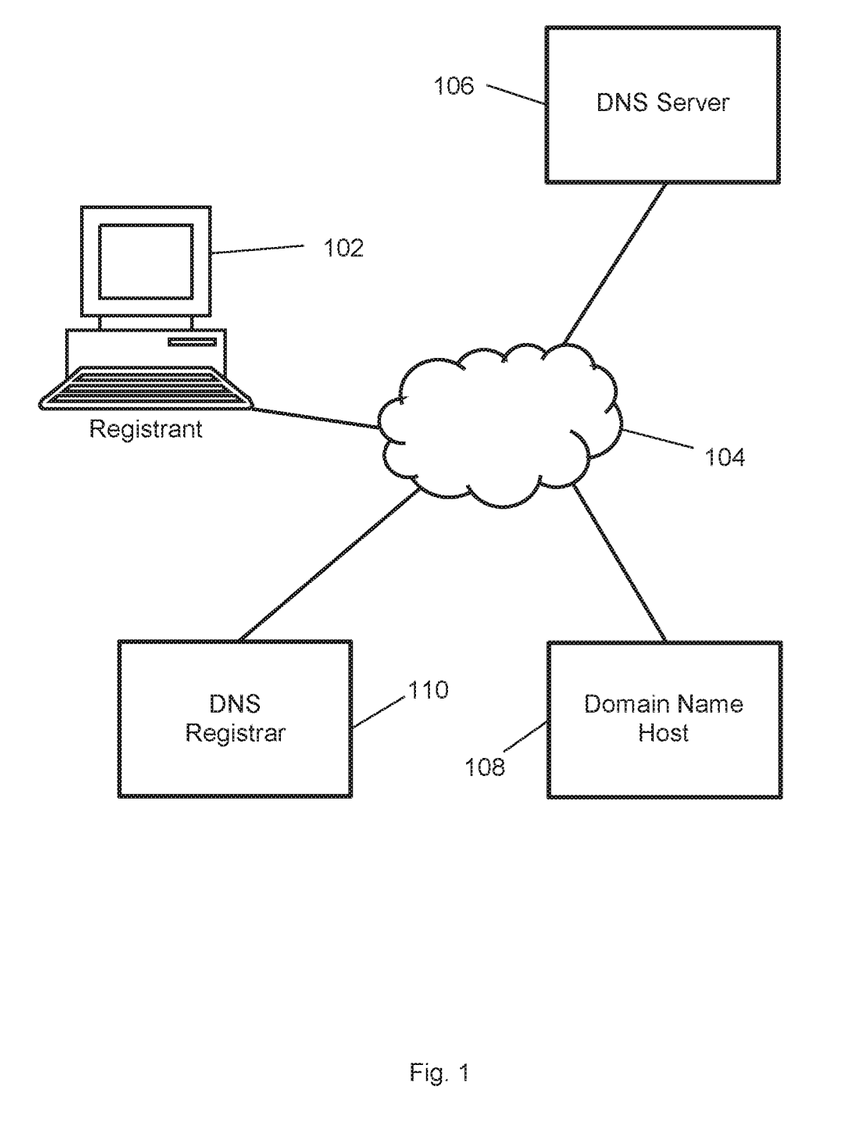
FIG. 1 is a schematic diagram illustrating a portion of the domain name system ("DNS") according to some embodiments.

FIG. 1 is a schematic diagram illustrating a portion of the domain name system ("DNS") according to some embodiments. As depicted in FIG. 1, a domain name (e.g., www.example.com) can be registered to an internet user known as a "registrant" 102 by a company known as a "registrar" 110. In general, registrars compete with one another to register domain names for registrants. An internet user interacts with a registrar 110 through the internet 104 to purchase, or "register", a domain name, thereby becoming a registrant 102 for that name. The registrar 110 asks the registrant 102 to provide various contact and technical information for the registration. The registrar 110 then keeps a record of the contact information and submits the technical information to the DNS registry (not shown).

When any internet user (not shown) attempts to navigate his or her browser to the registered domain through internet 104, the browser contacts a DNS server 106, which provides an IP address for the domain name host 108 of the registered domain by looking up an appropriate DNS resource record for the domain name. The internet user's browser then navigates to the domain name host 108 using its IP address to retrieve the resource of the domain name, e.g., content.

For ease of discussion, a registrar is identified with its hardware computer servers unless otherwise specified or clear from context. Further, an internet user has a hardware client computer. For ease of discussion, a registrant (e.g., registrant 102) is identified with his or her hardware client computer unless otherwise specified or clear form context.

Figure 2:
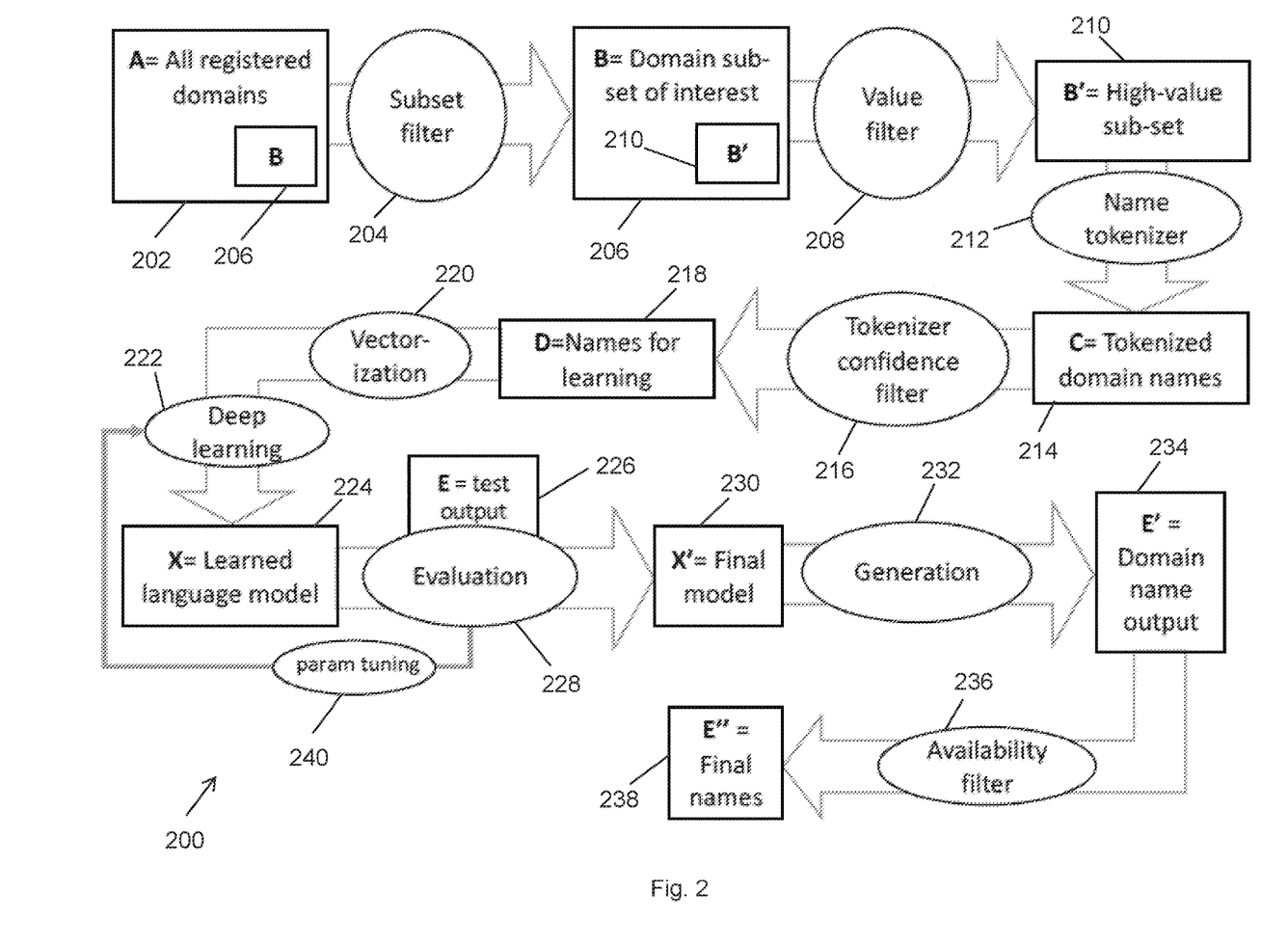
FIG. 2 is a hybrid flow diagram of a method according to some embodiments.

FIG. 2 is a hybrid flow diagram of a method 200 according to some embodiments. Method 200 may be used to obtain one or more unregistered yet valuable domain names. Method 200 may be implemented on computer hardware as shown and described below in reference to FIG. 3, for example.

At block 204, method 200 accepts a set A 202 of all registered domain names and filters that set to retain a subset B 206 of domain names of interest. (FIG. 2 depicts subset B 206 as appearing inside of set A 202. However, subset B 206 is not identified until the subset filter of block 204 is applied. Further, the designations or names for the sets of domain names and other entities are included for purposes of discussion and pedagogy. Other names or naming conventions may be used in the alternative without altering the scope of the invention disclosed herein.) Note that set A 202 is useful for obtaining more focused and valuable domain names from method 200. In the broadest interpretation, "all registered dot COM domain names" may be an interesting input set, as the generated output would be "names that are linguistically similar to registered names, but are not registered." However, such a set would span domain names that include many natural languages, brand protection portfolios with intentional misspellings, and the work of domain-generation algorithms not intended for human users. Thus, the learned language model would be vast and non-specific.

Instead, an input set like "Registered dot COM names where WHOIS data indicates a German registrant, that do not redirect and host content where the primary language is German, with DNS traffic in the upper 25th percentile" is much more specific. Here, the model would be expected to capture the language of popular German domain names. The generated model output would likely be interesting to a German domain name investor. One could identify many characteristics to form these input sets based on the needs of the downstream consumer.

Thus, the filtering characteristics applied at block 204 are many and varied. Examples of such characteristics follow, organized by category. Note that the categories may overlap. Note further that one or more characteristic, selected from one (or more than one) characteristic category, may be applied as a filter to exclude or retain domain names at block 204.

A first filtering characteristic category is registration history. The set A 200 may be filtered to retain or remove domain names that have a particular registration history. Types of registration history characteristics include, by way of non-limiting example, whether, and the type of any constraints on renewals or transfers, registrar identity, pricing data, such as pricing tier from among a defined plurality of pricing tiers, registration date, and registration time. Any, or a combination, of these characteristics may be applied, possibly in combination with any, or a combination, of characteristics selected from one or more other characteristic categories.

A second filtering characteristic category is linguistic characteristics. The set A 200 may be filtered to retain or remove domain names that have a particular linguistic characteristic. Types of linguistic characteristics include, by way of non-limiting example, limits to constraints on lengths, character patterns, inclusion or exclusion of certain characters, ease of tokenization, natural language of origin, and ease of pronounceability. Any, or a combination, of these characteristics may be applied, possibly in combination with any, or a combination, of characteristics selected from one or more other characteristic categories.

A third filtering characteristic category is web traffic characteristics. The set A 200 may be filtered to retain or remove domain names that have a particular web traffic characteristic. Types of web traffic characteristics include, by way of non-limiting example, constraints on DNS requests, DNS requests by type, actual traffic received, geographical source of such traffic, and whether and to what extent the traffic is from humans or machines. Any, or a combination, of these characteristics may be applied, possibly in combination with any, or a combination, of characteristics selected from one or more other characteristic categories.

A fourth filtering characteristic category is WHOIS characteristics. The set A 200 may be filtered to retain or remove domain names that have a particular WHOIS characteristic. Types of WHOIS characteristics include, by way of non-limiting example, geographical properties (e.g., country, state, or city of origin), physical contact addresses (e.g., country, state, or city of origin), email addresses, and privatization status. Any, or a combination, of these characteristics may be applied, possibly in combination with any, or a combination, of characteristics selected from one or more other characteristic categories.

A fifth filtering characteristic category is current or topical marker characteristics. The set A 200 may be filtered to retain or remove domain names that have a particular current or topical marker characteristic. Types of current or topical marker characteristics include, by way of non-limiting example, subject matter of domain or pages within (e.g., organized by the Dewey decimal system), participation in domain parking or pay-per-click programs, and whether content exists on a web page for the domain name. Any, or a combination, of these characteristics may be applied, possibly in combination with any, or a combination, of characteristics selected from one or more other characteristic categories.

A sixth filtering characteristic category is geographical marker characteristics. The set A 200 may be filtered to retain or remove domain names that have a particular geographical marker characteristic. Types of geographical marker characteristics include, by way of non-limiting example, natural language of hosted content, WHOIS country of registration, generalizations drawn from choice of registrar or web-host, and IP geolocation outcomes. Any, or a combination, of these characteristics may be applied, possibly in combination with any, or a combination, of characteristics selected from one or more other characteristic categories.

A seventh filtering characteristic category is routing characteristics. The set A 200 may be filtered to retain or remove domain names that have a particular routing characteristic. Types of routing characteristics include, by way of non-limiting example, whether the domain redirects to another domain, and the latency in reaching the domain. Any, or a combination, of these characteristics may be applied, possibly in combination with any, or a combination, of characteristics selected from one or more other characteristic categories.

An eighth filtering characteristic category is pricing characteristics. The set A 200 may be filtered to retain or remove domain names that have a particular pricing characteristic. Types of pricing characteristics include, by way of non-limiting example, number of sales in aftermarket marketplaces, sales prices in aftermarket marketplaces, valuation for aftermarket marketplaces, and estimated price for aftermarket marketplaces. Any, or a combination, of these characteristics may be applied, possibly in combination with any, or a combination, of characteristics selected from one or more other characteristic categories.

A ninth filtering characteristic category is TLD characteristics. The set A 200 may be filtered to retain or remove domain names that have a particular TLD characteristic. Types of TLD characteristics include, by way of non-limiting example, TLD identity, classification of TLD as country code TLD ("ccTLD"), generic TLD ("gTLD"), or other TLD, TLD base size, age of TLD in marketplace, and TLD pricing information. Any, or a combination, of these characteristics may be applied, possibly in combination with any, or a combination, of characteristics selected from one or more other characteristic categories.

A tenth filtering characteristic category is security characteristics. The set A 200 may be filtered to retain or remove domain names that have a particular security characteristic. Types of security characteristics include, by way of non-limiting example, appearance on one or more blacklists, and appearance on one or more safe browsing lists. Any, or a combination, of these characteristics may be applied, possibly in combination with any, or a combination, of characteristics selected from one or more other characteristic categories.

Note that the filtering characteristics that may be applied at block 204 of method 200 are not limited to those explicitly listed herein. Other characteristics may be used in addition or in the alternative. After the actions of block 204, control of method 200 passes to block 208.

At block 208, method 200 accepts subset B 206 and filters that set to retain high-value subset B' 210 of high-value domain names. (FIG. 2 depicts high-value subset B' 210 as appearing inside of subset B 206. However, high-value subset B' 210 is not identified until the value filter of block 208 is applied.) That is, block 208 identifies high-value subset B' 210 of B 206 utilizing zero or more additional criteria that identify the higher value (or "better") domains in B 206. The additional criteria may be based on the same domain characteristics as at block 204, but the purpose of block 208 is to refine subset B 206 into a subset of higher value domains. For example, if B 206 is "all domain names where WHOIS information is indicative of German registrant", then high-value B' 210 might be "all domain names where WHOIS information is indicative of German registrant and are of length less than twelve and receive at least 1000 DNS resolution queries per day." It might be the case that high-value subset B' 210 is identical to subset B 206. It might be the case that B' 210 is a random sample of B 206. Even though the model might be built from the names in B' 210 some embodiments also model B 206; in essence, the names in high-value subset B' 210 may be considered as more representative members of the language defined by subset B 206. After the actions of block 208, control of method 200 passes to block 212.

At block 212, method 200 applies a name tokenizer to high-value subset B' 210 to produce tokenized subset C 214. The actions of this block, and those of block 216, are optional and may be absent from some embodiments. If the actions of these blocks are not performed, then the learning set D 218 (described in detail with respect to block 216 below) is identical to high-value subset B' going forward. Tokenization may be considered as the annotation or identification of sub-section boundaries inside a domain string. Most often, this means identifying the component "words" inside a larger name. Technical specifications prevent domain names from being space-delimited, and many names are a concatenation of multiple words or terms. For example, the string "thisisadomainname" might be tokenized as "this|is|a|domain|name" where the special pipe character "|" denotes a boundary, and the pipe character is not in the character-space from which domain strings are composed. Often, but not exclusively, tokenization algorithms are based on probabilistic dictionary techniques. Different tokenization methods may produce different annotations. Explicitly annotating boundaries as a pre-processing step can help to expedite the learning of language models (block 222) by suppressing the need for the learning process to derive such boundaries implicitly. After the actions of block 212, control of method 200 passes to block 216.

At block 216, method 200 accepts tokenized subset C 214 and filters that set to retain learning set D 218 of domain names that will be used to train the machine learning algorithm. Note that actions of this block are optional; for example, some embodiments may retain block 212 and omit block 216, and some embodiments may omit both block 212 and block 216. Nevertheless, embodiments that include the actions of block 212 may also optionally include the actions of block 216. Embodiments that include block 212 may utilize a tokenization technique that outputs a numeric "confidence score" with its tokenization annotation. This number speaks to the ambiguity or difficulty, or lack thereof, in the tokenization process. For example, a string like "choosespain" might be viably tokenized as "choose|spain" or "chooses|pain", with quite different semantic implications. Additionally, a string like "asdfghjklqwerty" is unlikely to be cleanly tokenized against an English dictionary. In both cases one would anticipate low confidence scores. Confidence scores may be absolute (i.e., on [0,1]) or relative. (It should be emphasized a domain name string that is not composed exclusively of dictionary terms does not necessarily imply low tokenization confidence.) Block 216 may filter using a threshold such that D 218 excludes domain name strings that have a confidence score below the threshold. That is, after an application of block 214, D 218 does not include members of C 214 with low tokenization confidence. Such filtering can prevent excessively "noisy" or "nonsense" names from becoming a part of the modeled input. At this stage learning set D may include names data reflecting the following, for example: "tape|news", "tar-|bloc", "target|nepal", "tarheel|taxi", and "tarot|seed". After the actions of block 216, control of method 200 passes to block 220.

At block 220, method 200 prepares an input to a machine learning algorithm by vectorizing learning set D 218. In general, preparing learning set D 218 for neural network input involves the vectorization of domain strings. This may be achieved by representing individual characters as "one-hot" vectors of a length equal to the size of the character alphabet (inclusive any special tokenization symbol). A domain string may be tokenized as a sequence (or vector, or time-series) of such vectors, which may be represented as a 2-dimensional binary matrix. After the actions of block 220, control of method 200 passes to block 222.

At block 222, method 200 supplies the vectorized learning set of block 220 as an input to a machine learning algorithm (e.g., a neural network or deep learning algorithm). Suitable neural network machine learning algorithms include, by way of non-limiting example, feed-forward neural networks, recurrent neural networks, long-short term memory neural networks, and convolutional neural networks. These example neural network machine learning algorithms share similar multi-level configurations. In each case, the network is composed of an "input layer" of nodes equal to the size of the character alphabet (and therefore the one-hot vectors), one or more "hidden layers" of nodes, and a final "output layer" of nodes equal in size to the input layer. The hidden layers, by design, may not have the capacity to store or reproduce exactly what was presented in the input. Instead, they abstract and capture generalized properties of the input language at the character-sequence level. At an extremely high level, it is the responsibility of the hidden layers per the learning algorithm chosen, to be provided a character (on the input layer) and predict the next character in the sequence (on the output layer). This predictive capability is accumulated by observing the character sequences (and broader context) present in learning set D 218. When processing elements, the internal structure of the network is updating to reinforce and/or forget its predictive pathways. Collectively, the network forms a learned language model X 224. After the actions of block 222, control of method 200 passes to block 228.

At block 228, method 200 performs an evaluation of language model X 224. The actions of this block may be performed repeatedly in concert with the actions of blocks 240 and 222. For example, method 200 may be repeatedly or iteratively evaluated and refined.

To perform one evaluation and refinement instance per blocks 222, 228, and 240, first, language model X 224 is used in a generative manner to produce test output E 226, a set of newly generated domain names. The generation may be performed by priming language model X 224 with a single-character, which may be randomly selected, e.g., consistent with the probability distribution observed in learning set D 218, and requiring language model X 224 to predict the next character in the sequence. Used successively, this process constructs a domain name string, and used repeatedly in this manner, the multiple domain name strings in test output E 226. Second, test output E 226 may be evaluated, e.g., using one of two disclosed techniques.

A first evaluation technique determines whether language model X 224 generates a certain of proportion of (possibly "good") names that have been registered before but that it did not observe during training. If so, then this is an indicator that the language is learn-able and confidence in the value of the generated names that are not currently registered is justified. That is, determine whether a ratio of a number of registered domain names generated by the method that possess the at least one specified characteristic (and may be high-value) but that are not in the training subset of domain names (e.g., |E∩B\D| or |E∩B'\D|, where "∩" denotes intersection, "\" denotes set subtraction, and "|·|" denotes cardinality), to a number of domain names generated by the method (e.g., |E|), exceeds a threshold, e.g., determine whether |E∩B\D|÷|E|>T, or |E∩B'\D|÷|E|>T, where T denotes a threshold and "÷" denotes numeric division. If the ratio is high enough, e.g., at least 25%, then consider model X as a good model for generating names that resemble those in subset B 206 (or high-value subset B' 210B'). Thus, the threshold T may be set to 25% in some embodiments. Other embodiments may use any other threshold between zero and one.

A second evaluation technique determines whether a success metric for applying a registered domain name classifier to test output E exceeds a threshold (which may be a different threshold that the threshold of the first evaluation technique, above). According to some embodiments, the classifier may be a human. According to other embodiments, the classifier may be a trained machine learning classifier, e.g., a traditional or deep machine learning methods to possibly include adversarial neural networks, or a support vector machine. In more detail, the classifier attempts to classify test output E 226 into two classes: previously registered names (e.g., $E_1$=E∩A) and previously unregistered names (e.g., $E_2$=E\A). If the performance of the classifier is low, i.e., the classifier cannot correctly classify the names in E into classes $E_1$, $E_2$, then this means that the two classes are indistinguishable and thus language model X 224 is deemed to have sufficiently captured the language such that confidence in the value of the generated names is justified. The success metric may utilize receiver operating characteristic ("ROC"), precision-recall, F-measure, root-mean-square error ("RMSE"), or other classifier performance metrics. Other metrics are also possible.

If the evaluation of block 228 indicates that language model X 224 is not yet sufficiently successful, then control of method 200 passes to block 240, in which parameters for language model X 224 are tuned. In general, neural network algorithms expose parameters, which can affect the efficacy of the learned model or the speed at which the model learns. Such tunable variables include, but are not limited to: number of hidden layers, number of nodes per layer, number of training epochs, optimization algorithm (e.g. gradient descent), activation function (e.g., tan h, softmax), or loss function (e.g., cross entropy). These parameters are adjusted per block 240, and then control of method 200 passes back to the learning of block 222. An updated language model X 224 is produced, and the evaluation process repeats as disclosed.

If the evaluation of block 228 indicates that language model X 224 is sufficiently successful, then the sufficiently successful language model X 224 is denoted as final language model X' 230 and stored in persistent memory for later generative usage, and control passes to block 232.

At block 232, final language model X' 230 is used generatively to produce one or more domain name strings. The generation process is essentially the same as that which produced test output E 226 per the evaluation of block 228. This generation process produces domain name output E' 234.

Note that the domain name generation according to embodiments is distinct and different from the traditional "suggestion" task whereby a user is presented with similar available names if the user's initial search term is not available. Instead, some embodiments learn the shared properties of thousands (or millions, tens of millions, or even hundreds of millions) of names and find other names in that class regardless of their topic space.

At block 236, method 200 applies an availability filter to domain name output E' 234. The actions of this block remove from domain name output E' 234 any domain names that are already registered. This may be accomplished by checking the registration status of the domain names in domain name output E' 234 with a DNS registrar or with the DNS registry itself. According to some embodiments, method 200 may be implemented by, or in concert with, a registrar or the registry. In such embodiments, method 200 communicates with a local database that stores DNS registration records. Once any already-registered domain names are removed from domain name output E' 234, method 200 outputs final domain names E" 238.

Final domain names E" 238 may be output in a variety of ways. According to some embodiments, final domain names E" 238 are output by being displayed on a computer monitor. According to some embodiments, final domain names E" 238 are output by being emailed to a selected email address. According to some embodiments, final domain names E" 238 are output by presenting them to a user for registration. Such embodiments may be implemented by, or in coordination with a registrar or registry, which can implement the registration process. Such embodiments may present the user with a graphical user interface by which the user may select a particular domain names from final domain names E" 238 and register it using the same interface. The registration may be accomplished using standard domain name registration techniques.

Figure 3:
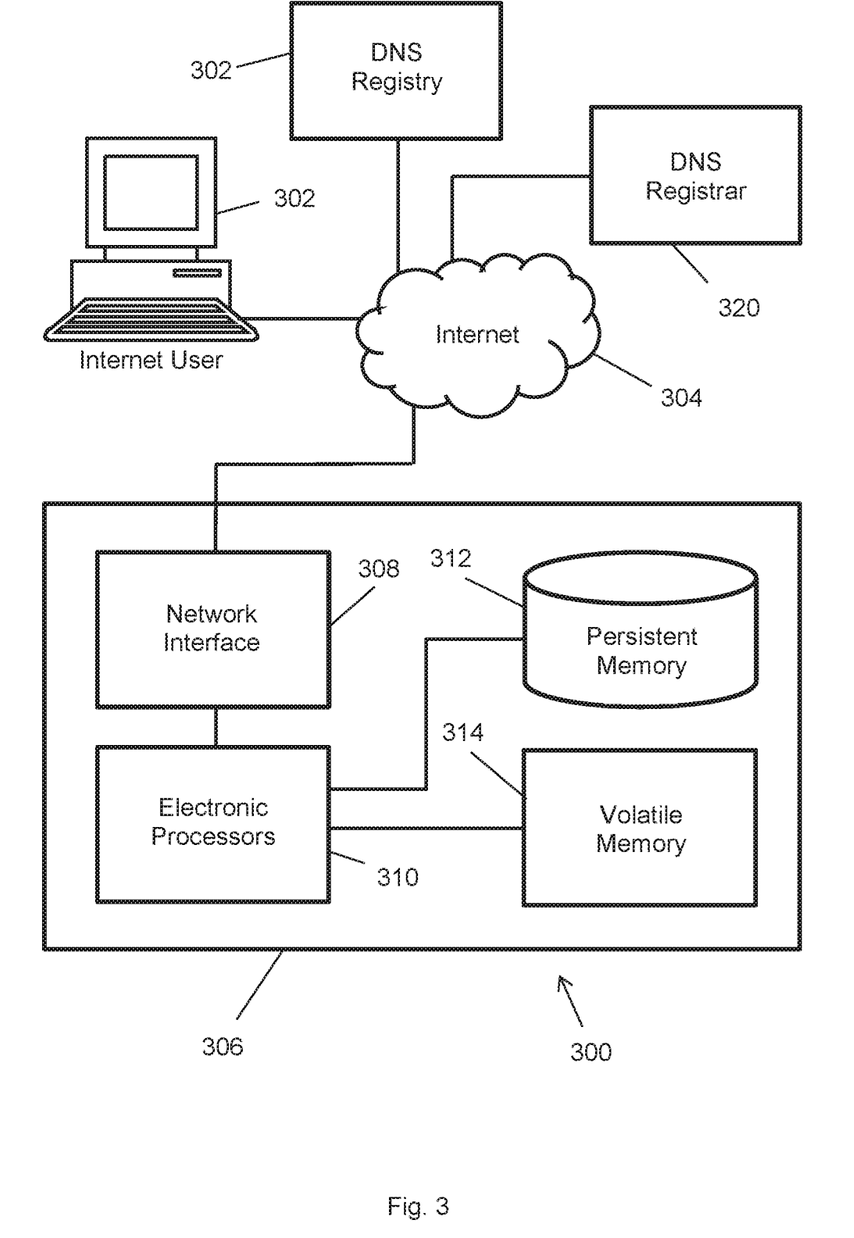
FIG. 3 is a schematic diagram of a system suitable for implementing methods according to some embodiments.

FIG. 3 is a schematic diagram of a system 300 suitable for implementing methods according to some embodiments. System 300 may be based around an electronic hardware internet server computer 306, which may be communicatively coupled to the internet 304. Server computer 306 includes network interface 308 to affect the communicative coupling to the internet 304. Network interface 308 may include a physical network interface, such as a network adapter. Server computer 306 may be a special-purpose computer, adapted for reliability and high-bandwidth communications. Thus, server computer 306 may be embodied in a cluster of individual hardware server computers, for example. Alternately, or in addition, server computer 306 may include redundant power supplies. Persistent memory 312 may be in a Redundant Array of Inexpensive Disk drives (RAID) configuration for added reliability, and volatile memory 314 may be or include Error-Correcting Code (ECC) memory hardware devices. Server computer 306 further includes one or more electronic processors 310, which may be multi-core processors suitable for handling large amounts of information. Electronic processors 310 are communicatively coupled to persistent memory 312, and may execute instructions stored thereon to effectuate the techniques disclosed herein, e.g., method 200 as shown and described in reference to FIG. 2. Electronic processors 310 are also communicatively coupled to volatile memory 314.

Server computer 306 is communicatively coupled to DNS registry 302 and/or DNS registrar 320. (According to some embodiments, server computer 306 is provided by a registrar or registry for implementation of the disclosed method.) The communication between server computer 306 and DNS registry 302 or DNS registrar 320 allows for determining whether generated domain names are currently registered, and also permits users to register unregistered domain names as disclosed herein.

Disclosed embodiments have many advantages and variations. Embodiments are superior to domain name generation techniques that rely on a pre-defined language of words with a fixed vocabulary. Instead, some embodiments utilize per-character generation of a trained language model using deep-learning, which is not dictionary-backed.

Some embodiments have the ability to generate pronounceable "not words" for the language. For example, disclosed techniques might generate a domain string like "novitos" and predict it is more valuable than the also six-character string "zfqwlu" because the former adheres to the consonant-vowel conventions of English. Neither would be found in a dictionary.

Some embodiments can generate domain names in languages that are not easily tokenized. Annotating word boundaries can help deep-learning techniques converge quicker, but are optional. This means that some embodiments can generate domains for natural languages without having to create a tokenizer, dictionary, and/or topic modeling infrastructure.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of generating unregistered internet domain names using machine learning, the method comprising:
  receiving an input that identifies at least one specified characteristic, wherein the at least one specified characteristic is associable with registered domain names;
  identifying, using an electronic processor, a subset of registered domain names having the at least one specified characteristic;
  tokenizing, using the electronic processor, the subset of registered domain names, wherein the tokenizing comprises identifying, for a domain name of the subset of registered domain names, at least one sub-section boundary within the domain name;
  determining a confidence score for the domain name of the subset of registered domain names, wherein the confidence score is based on an ambiguity or a difficulty of the tokenizing;
  filtering, using the electronic processor, the subset of registered domain names to retain registered domain names with confidence scores above a threshold confidence score;
  vectorizing, using the electronic processor, a training subset of domain names in the tokenized subset of registered domain names to obtain a set of vectors;
  training, using the electronic processor, a machine learning algorithm with the set of vectors to produce a trained machine learning model;

generating, using the electronic processor, at least one output domain name by the trained machine learning model; and outputting, using the electronic processor, the at least one output domain name.

2. The method of claim 1, wherein the outputting comprises causing the at least one output domain name to be displayed.

3. The method of claim 1, further comprising, prior to the vectorizing, thinning the subset of registered domain names to retain domain names with a resale value exceeding a purchase price.

4. The method of claim 1, further comprising:
presenting the at least one output domain name to a potential registrant; and
registering the at least one output domain name to the potential registrant.

5. The method of claim 1, further comprising:
selecting, prior to the generating, a set of parameters for the trained machine learning model;
evaluating, prior to the outputting, the trained machine learning model using the at least one output domain name; and
repeating the selecting, the generating, and the evaluating at least once prior to the outputting.

6. The method of claim 5, wherein the evaluating comprises one of:
determining whether a ratio exceeds a first predetermined threshold, wherein the ratio comprises a number of output domain names that have the at least one specified characteristic but are not in the subset of domain names to the number of output domain names; or
determining whether a success metric for applying a registered domain name classifier to output domain names exceeds a second predetermined threshold.

7. The method of claim 1, wherein the at least one specified characteristic comprises at least one of: a registration history characteristic, a linguistic characteristic, a traffic characteristic, a whois information characteristic, a content characteristic, a geographical characteristic, a routing characteristic, an aftermarket pricing characteristic, a top-level-domain characteristic, or a security characteristic.

8. The method of claim 1, wherein the machine learning algorithm is based on an electronically stored network comprising an input layer of nodes, at least one hidden layer of nodes, and an output layer of nodes.

9. The method of claim 8, wherein the machine learning algorithm comprises at least one of: a feed-forward neural network, a recurrent neural network, a long-short term memory, or a convolutional neural network.

10. The method of claim 1, wherein the subsection boundary is a boundary between at least two words of a set of words,
wherein the tokenizing further comprises identifying the sub-section boundary within the domain name, including: i) identifying a first sub-section boundary within the domain name to delineate a first set of words comprising the entire domain name, and ii) identifying a second sub-section boundary within the domain name to delineate a second set of words comprising the entire domain name, wherein the first set of words is different than the second set of words.

11. The method of claim 1, wherein the tokenizing further comprises identifying the sub-section boundary within the domain name, including:

identifying at least two sub-section boundaries within the domain name, wherein each of the at least two sub-section boundaries delineates a different set of words within the domain name.

12. The method of claim 1, wherein the tokenizing further comprises identifying the sub-section boundary within the domain name, including:
identifying at least two sub-section boundaries within the domain name to delineate a plurality of words within the domain name.

13. The method of claim 1, wherein filtering, using the electronic processor, the subset of registered domain names further comprises at least one of:
identifying domain names in the subset of registered domain names having a character length based on a threshold; or
identifying domain names in the subset of registered domain names having a number of domain name search resolution queries based on a threshold.

14. The method of claim 1, wherein the ambiguity or the difficulty of the tokenizing comprises an identified first sub-section boundary within the domain name and an identified second sub-section boundary within the domain name, wherein the identified first sub-section boundary delineates a first set of words, wherein the identified second sub-section boundary delineates a second set of words different than the first set of words.

15. The method of claim 1, wherein the tokenizing comprises generating one or more tokenized strings for the domain name.

16. A system for generating unregistered internet domain names using machine learning, the system comprising at least one electronic processor configured to perform:
receiving an input that identifies at least one specified characteristic, wherein the at least one specified characteristic is associable with registered domain names;
identifying, using an electronic processor, a subset of registered domain names having the at least one specified characteristic;
tokenizing, using the electronic processor, the subset of registered domain names, wherein the tokenizing comprises identifying, for a domain name of the subset of registered domain names, at least one sub-section boundary within the domain name;
determining a confidence score for the domain name of the subset of registered domain names, wherein the confidence score is based on an ambiguity or a difficulty of the tokenizing;
filtering, using the electronic processor, the subset of registered domain names to retain registered domain names with confidence scores above a threshold confidence score;
vectorizing, using the electronic processor, a subset of domain names in the tokenized set of registered domain names to obtain a set of vectors;
training, using the electronic processor, a machine learning algorithm with the set of vectors to produce a trained machine learning model;
generating, using the electronic processor, at least one output domain name by the trained machine learning model; and
outputting, using the electronic processor, the at least one output domain name.

17. The system of claim 16, wherein the outputting comprises causing the at least one output domain name to be displayed on a computer monitor communicatively coupled to the at least one electronic processor.

18. The system of claim 16, wherein the at least one electronic processor is further configured to, prior to the vectorizing, perform thinning the set of registered domain names to retain domain names with a resale value exceeding a purchase price.

19. The system of claim 16, wherein the at least one electronic processor is further configured to perform:
presenting the at least one output domain name to a potential registrant; and
registering the at least one output domain name to the potential registrant.

20. The system of claim 16, wherein the at least one electronic processor is further configured to perform:
selecting, prior to the generating, a set of parameters for the trained machine learning model;
evaluating, prior to the outputting, the trained machine learning model using the at least one output domain name; and
repeating the selecting, the generating, and the evaluating at least once prior to the outputting.

21. The system of claim 20, wherein the evaluating comprises one of:
determining whether a ratio exceeds a first predetermined threshold, wherein the ratio comprises a number of output domain names that have the at least one specified characteristic but are not in the subset of domain names to the number of output domain names; or
determining whether a success metric for applying a registered domain name classifier to output domain names exceeds a second predetermined threshold.

22. The system of claim 16, wherein the at least one specified characteristic comprises at least one of: a registration history characteristic, a linguistic characteristic, a traffic characteristic, a whois information characteristic, a content characteristic, a geographical characteristic, a routing characteristic, an aftermarket pricing characteristic, a top-level-domain characteristic, or a security characteristic.

23. The system of claim 16, wherein the machine learning algorithm is based on an electronically stored network comprising an input layer of nodes, at least one hidden layer of nodes, and an output layer of nodes.

24. The system of claim 23, wherein the machine learning algorithm comprises at least one of: a feed-forward neural network, a recurrent neural network, a long-short term memory, or a convolutional neural network.

\* \* \* \* \*